3,300,325
CAMOUFLAGE PAINT REFLECTING ULTRAVIOLET LIGHT FOR USE IN SNOWY COUNTRY
Gunnar Wilhelm Lindquist, Gamleby, Sweden, assignor to K. B. Svensk Färgindustri, Lundin & Co., a corporation of Sweden
Filed Apr. 1, 1963, Ser. No. 269,583
Claims priority, application Sweden, Apr. 3, 1962, 3,710/62
9 Claims. (Cl. 106—195)

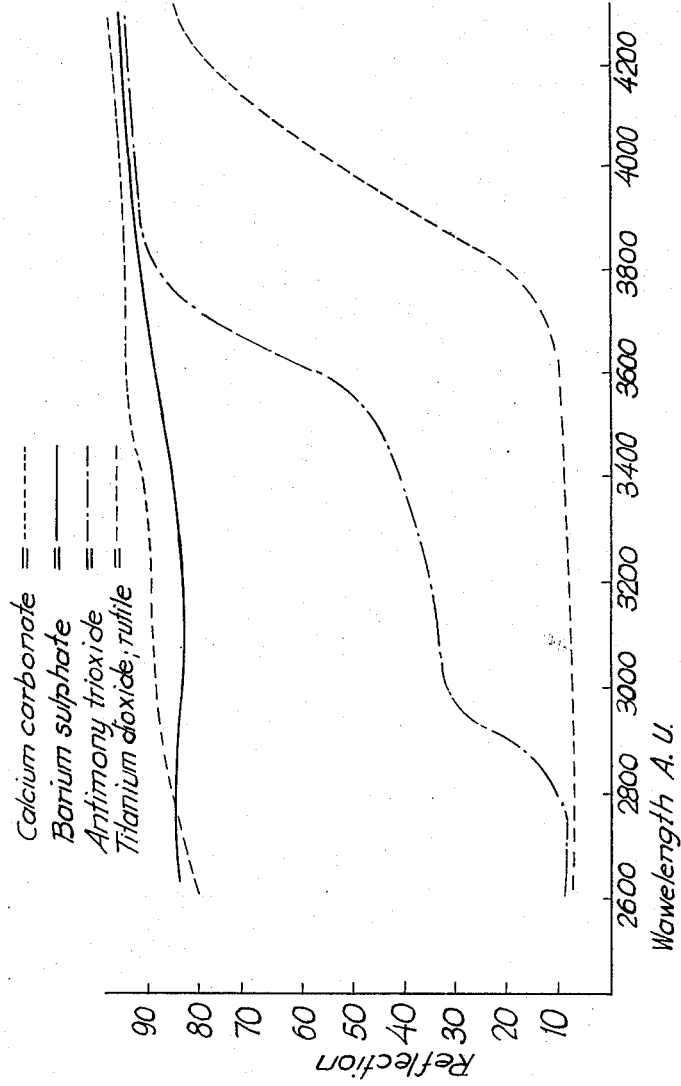

This invention relates to the camouflage art, and is concerned with improvements in camouflage paints reflecting ultraviolet light and hence useful under snowy conditions.

For military purposes it has been considered suitable in winter to whiten objects, such as vehicles, guns, etc. to obtain a whiteness corresponding to a winter landscape and thereby to prevent or highly difficult detection by reconnaissance, for example from an airplane or the like.

The criterion for such white paints was a reasonable assemblance only as to whiteness in the visual range that is, within the range of wavelengths between 8,000 and 4,000 A.U. (i.e. Angstrum units). The composition of the pigment has generally not been stipulated and if special requirements have been made for a certain purchase, titanium dioxide or a mixture containing this pigment has been dictated.

In using titanium dioxide (rutile or anatase type) for a camouflage paint in winter no attention has been paid to the fact that the reflection of light in the range of wavelengths between 4,000 and 3,000 A.U. is very low as compared with that of snow.

Consequently, if photographs are taken, for example from an airplane with the use of special filters which transmit light within the range of the ultraviolet spectrum only, it is easy to unmask such winter camouflage made with a paint which contains titanium dioxide. The objects so camouflaged appear on the photographs in the form of dark or black marks standing out against the white surrounding.

If special optical instruments, for instance of quartz glass, and sensitized negative films for ultraviolet light are used in combination with intereference filters for certain sections in the range of wavelengths between 4,000 and 3,000 A.U. the demands on the white winter camouflage are extremely increased. Although other pigments, such as antimony trioxide, zinc sulphide, zinc oxide and white lead result in a somewhat better photograph than titanium dioxide from the point of view of camouflage, they are nevertheless unsatisfactory. As a matter of fact, if objects covered with paints based on these pigments are photographed with the use of special filters, such objects will clearly stand out against the snow in the form of more or less dark marks or spots which are likely to attract notice and therefore cannot be considered to be satisfactory camouflage paints. Tests performed have shown that hitherto used paint pigments with high covering power have high reflection factors within the visual spectrum, that is, in the range of wavelengths between 8,000 and 4,000 A.U., but low reflection factors within the range of the ultraviolet spectrum that is, in the range of wavelength between 4,000 and 3,000 A.U.

As has been proved by tests regarding the reflection factors of a plurality of different white pigments it is nevertheless possible to increase the reflection factor in the range of wavelength between 4,000 and 3,000 A.U. by the use of white paints containing paint pigments of substances which in ordinary cases are considered less suitable opaque paints which have a poor covering or hiding power and are used only exceptionally for painting objects. Experiments made in connection with this invention have proved that white winter camouflage paint are obtainable which excellently reflect ultraviolet light. According to the invention the paint to an essential degree contains one or more white pigments having a high reflection factor within the range of the ultraviolet spectrum (4,000 to 3,000 A.U.) the paint pigment being dissolved, dispersed or emulsified in a binder for example, linseed oil alkyd, polyvinyl acetate, polyvinyl isobutyl ether, ethyl cellulose, or nitro cellulose which binder is preferably dissolved in a solvent, dispersing or emulsifying agent such as xylene, toluene, ethyl acetate, acetone, alcohol and/or water. It has proved that paint pigments consisting of, or randomly mixed with sulphate, carbonates, silicates or oxides of barium, calcium, and magnesium are especially suitable for this purpose. In certain cases, comparatively favourable and applicable results have also been obtained with the use of white paints made from oxides of antimony. Further inventive characteristics will appear from the following description.

Researches as to the reflection factors of different paint pigments have shown that most of the so-called extender pigments have a high reflection factor in the range of wavelengths between 4,000 and 3,000 A.U. which range is important to winter camouflage, whereas such pigments admixed with a binder, for instance linseed oil as a rule, do not result in an opaque paint. The paint applied becomes transparent and has low reflection factors and consequently low camouflage effects both within the visuable range of wavelengths and the ultraviolet range that is, between 4,000 and 3,000 A.U. This fact is a result of the slight difference between the refractive indexes of the extender pigment and the binder. Consequently, in the technics of painting and varnishing these pigments are considered unusable as covering pigments except for certain glue paints dilutable with water.

Now it has been proved that if one or more of these extender pigments suitably consisting of an appropriate amount of sulphate, carbonate, silicate and/or oxides of barium, calcium and magnesium are dissolved, dispersed or emulsified in an organic binder which is dissolved in an organic solvent, the individual pigment particles will protrude after evaporation of the solvent, above the surface of the layer of paint and as a result of different refractive index between pigment and binder compared to the refractive index between pigment and air such that the layer of paint will reflect light within the same range of wavelengths and to the same extent as the pigment contained therein. In this connection it is an important and novel feature that such pigments can be used in opaque paints contrary to adopted opinion and practice in paint industry.

The invention is further explained with reference to a diagram illustrated in the annexed drawing which illustrates the difference of reflectivity between the range of wavelengths of 4,000 to 3,000 A.U. and the adjacent range of wavelengths of visible light. As will be clearly seen from this diagram a paint consisting of titanium dioxide (rutile) has very high reflection factors within the visible spectrum whereas the curve has a very steep slope at about 4,000 A.U. However, in said range between 4,000 and 3,000 A.U. for the camouflage purpose in consideration the reflectivity is too low. Consequently, if photographs are taken with filters possibly in combination with special lenses and with films sensitive to ultraviolet light a surface coated with this paint will be represented in the form of a completely black surface as compared with the surrounding snow surface which will appear altogether white. For this reason an object painted with titanium dioxide pigment can be easily detected on the photograph. The same holds true in case of reconnoitering with a television camera provided with a corresponding special filter for photographing with ultraviolet rays. Antimony trioxide has a somewhat better reflectivity, but is not quite satisfactory in case of large objects. However, a remarkable improvement is illustrated by the curves for a paint according to the invention with pigments of calcium carbonate or barium sulphate. As will be seen from the diagram, both of these curves have a very slightly falling characteristic as to reflectivity both within the visible spectrum and within the range of wavelengths from 4,000 to 3,000 A.U. Consequently, it is very difficult or even impossible with the use of photographic or television technical methods to detect objects painted or covered with a paint which contains or consists of such paint pigments.

In view of difficulties in techniques of measurements the reflection factor is always indicated in relation to some generally approved standard whiteness, for example by pressed plates or barium sulphate ($BaSO_4$), magnesium carbonate ($MgCO_3$) or magnesium oxide ($MgO$). As a matter of fact there are always difficulties with snow as a standard of whiteness and with the use of existing measuring devices for instance the du. type Beckman spectrophotometer or the like. However, in deciding the suitability from the point of view of camouflage use is made of a photographic or television technical recording device having special filters within the range from 4,000 to 3,000 A.U.

An example of a suitable paint and the composition thereof for this purpose is given below.

| | Parts of weight |
|---|---|
| Calcium carbonate | 40 |
| Highly viscous chlorinated rubber | 10 |
| Plasticizer, chlorinated diphenyl | 6 |
| Aromatic solvent, for instance xylene | 44 |
| | 100 |

The paints composed in accordance with this invention may be directly applied to the objects to be camouflaged, such as vehicles, guns etc., or may be applied to the surface of for instance, a camouflage netting, by means of which the objects in consideration are covered to prevent observation from the outside. In this case camouflage nettings are advantageously used which have substantially plane surface elements, for instance horizontal surface elements with a view to avoiding shadow effects.

What is claimed is:

1. A camouflage paint reflecting ultraviolet light for use in snowy country, characterized in that the paint consists essentially of a dispersion, in a suitable binder, of at least one white pigment having a high reflection factor in the range of wavelengths between 3,000 and 4,000 Angstrum units, the ratio of pigment to binder being such that after evaporation of the vaporizable components of the paint from a layer thereof individual particles of pigment protrude above the surface of the paint layer.

2. A paint according to claim 1, characterized in that it contains a dispersing agent selected from the group consisting of xylene, toluene, ethyl acetate, acetone, alcohol and water.

3. A paint according to claim 1, characterized in that the pigment is selected from the groups consisting of those sulphates, carbonates, silicates and oxides of barium, calcium, magnesium and antimony which have a reflectance range of 3000–4000 Angstrum units, comprised in an organic binder dissolved in an organic solvent.

4. A paint according to claim 1 characterized in that it also contains a plasticizer.

5. A paint as defined in claim 1, which consists essentially of 40 parts by weight of calcium carbonate, 10 parts by weight of highly viscous chlorinated rubber, 6 parts by weight of chlorinated diphenyl and 44 parts by weight of xylene.

6. A method of camouflaging vehicles, guns and other objects by means of a paint according to claim 1, characterized by applying the paint directly to the objects.

7. A method of camouflaging vehicles, guns and other objects by means of a paint according to claim 1, characterized by applying the paint to a camouflage netting which covers the object.

8. A method according to claim 7, in which said camouflage netting has plane surfaced portions, and in which a layer of the paint defined in claim 1 is applied to such plane surfaced portions.

9. A camouflage paint as defined in claim 1, in which the binder is a member of the group consisting of linseed oil alkyd, polyvinyl acetate, polyvinyl isobutyl ether, ethyl cellulose, nitrocellulose and chorinated rubber.

References Cited by the Examiner

UNITED STATES PATENTS

| 1,968,243 | 7/1934 | Bonney et al. | 106—195 XR |
| 2,070,177 | 2/1937 | Pickett | 106—193 XR |
| 2,085,512 | 7/1937 | Schneider | 106—193 XR |
| 2,128,652 | 8/1938 | Kratz et al. | 106—195 XR |
| 2,572,252 | 10/1951 | Erasmus et al. | 106—193 XR |
| 3,008,844 | 11/1961 | Grunin | 106—193 |

ALEXANDER H. BRODMERKEL, *Primary Examiner.*

J. H. WOO, *Assistant Examiner.*